Patented Sept. 1, 1925.

1,552,176

UNITED STATES PATENT OFFICE.

HUGO LIEBERS, OF PRAGUE, CZECHOSLOVAKIA.

PROCESS FOR PRODUCING A NUTRIENT PREPARATION RICH IN VITAMINS.

No Drawing. Application filed December 4, 1924. Serial No. 753,824.

*To all whom it may concern:*

Be it known that I, HUGO LIEBERS, a citizen of the Republic of Czechoslovakia, residing at 3 Prikopi, Prague I, Czechoslovakia, have invented certain new and useful Improvements in a Process for Producing a Nutrient Preparation Rich in Vitamins, of which the following is a specification.

This invention relates to the production of a nutrient preparation rich in vitamins.

The invention consists of intimately mixing yeast with concentrated extracts of germinated cereals, especially with highly concentrated barley malt extract, with such an amount of extractive matter, that no fermentation will occur. Thereafter the mixture is for some time allowed to stand at rest.

By the mutual influence of yeast and of said extracts, for instance of barley-malt extract, after short time the taste of the yeast as well as that of the extract will perfectly disappear. Thereby by the action of the yeast ferments on the malt a pronounced fruit aroma is generated, the kind and strength of which depends upon the ratio of extractive matter contained in the malt extract, upon the proportion of yeast contained in the mixture, upon the temperature and finally upon the period of time, during which said mutual action is going on. This action may, if desired, be stopped at any convenient moment by heating the product up to about 50° to 70° centigrade.

But also without such limiting the development of the aroma by heat, the process yields a product which keeps well for very long time and contains beside abundant proportions of easily digestible nutrient substances (sugar and albumins) much living yeast, the fermenting power of which is not weakened, furthermore the diastatic and proteolytic ferments of the malt and finally all groups of vitamins (those acting against beri-beri, against scurvy and against rhachitis, and those favorizing growth), all of these vitamins at a rather considerable rate.

This product of high nutrimental value, which owing to its fruit aroma is an appreciated food not causing any aversion, exercises therefore a complete vitamin action and besides also those special therapeutic effects, which are aimed at by administering fresh or dried yeast. Moreover in view of its value this nutrient preparation is relatively very cheap.

If the product had been heated, only small quantities of living yeast and of proteolytic ferments are to be found therein, whilst the efficiency of the diastatic ferments of the malt and the activity of the vitamins has nearly not at all been weakened.

*Examples.*

1. Malt extract prepared in the usual manner is by further evaporation brought to a higher contents of extractive matter, for instance up to 92 degrees Balling. 1000 parts by weight of this concentrated extract are well mixed with 270 parts by weight of dehydrated yeast, (containing 29% of solid matter). If this mixture is kept at a temperature of 10° centigrade, it will after a week show an agreeable fruity taste.

2. 1000 parts by weight of the dry powder, as is obtained by subjecting to evaporation malt extract, are well mixed with 500 parts by weight of yeast, dehydrated to a high degree so as to contain about 32% of solid matter. A semi-liquid mass will result, which at a temperature of 30° centigrade keeps well for unlimited time. At room temperature within a week the mass will acquire a fruit-like taste, which further on increases on standing at rest. The yeast contents of the product corresponds to about 60% of pressed yeast.

I use the term "yeast" in the claims to include yeast of all kind, separated by pressing, centrifugation or the like and the term "dehydrated yeast" to include yeast separated by pressing or centrifugation and liberated afterwards partly or entirely of the remaining water by mechanical means or by drying.

I claim:

1. A process for producing a nutrient preparation rich in vitamins, which process consists in incorporating yeast with concentrated extracts of germinated cereals, the amount of extractive matter contained in the latter being chosen such as to prevent fermentation to occur, and thereafter allowing the mixture to stand at rest.

2. A process for producing a nutrient preparation rich in vitamins, which process consists in incorporating yeast with concentrated barley-malt extract, the amount of extractive matter contained in the latter being chosen such as to prevent fermentation to occur, and thereafter allowing the mixture to stand at rest.

3. A process for producing a nutrient preparation rich in vitamins, which process consists in incorporating dehydrated yeast with concentrated barley-malt extract, the amount of extractive matter contained in the latter being chosen such as to prevent fermentation to occur, and thereafter allowing the mixture to stand at rest.

4. A process for producing a nutrient preparation rich in vitamins, which process consists in incorporating dehydrated yeast with concentrated barley-malt extract, the amount of extractive matter contained in the latter being chosen such as to prevent fermentation to occur, thereafter allowing the mixture to stand at rest and stopping the action of the yeast ferments on the malt by heating the product.

5. A process for producing a nutrient preparation rich in vitamins, which process consists in incorporating dehydrated yeast with concentrated barley-malt extract, the amount of extractive matter contained in the latter being chosen such as to prevent fermentation to occur, thereafter allowing the mixture to stand at rest and stopping the action of the yeast ferments on the malt by heating the product up to about 50° to 70° centigrade.

6. A process for producing a nutrient preparation rich in vitamins, which process consists in incorporating dehydrated yeast with concentrated barley-malt extract, the amount of extractive matter contained in the latter being chosen such as to prevent fermentation to occur, thereafter allowing the mixture to stand at rest at ordinary temperature and stopping the action of the yeast ferments on the malt by heating the product up to about 50° to 70° centigrade.

7. A nutrient preparation containing malt and yeast and showing a fruit aroma owing to the action of the yeast ferments on the malt.

In testimony whereof I have affixed my signature.

HUGO LIEBERS.